United States Patent
Meigen et al.

(10) Patent No.: US 9,557,970 B2
(45) Date of Patent: *Jan. 31, 2017

(54) INTEGRATED DEVELOPMENT ENVIRONMENT FOR HETEROGENEOUS CLIENT/SERVER ENVIRONMENTS

(71) Applicant: SAP SE, Walldorf (DE)

(72) Inventors: Thomas Meigen, Dudenhofen (DE); Matthias Tebbe, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,254

(22) Filed: Dec. 17, 2015

(65) Prior Publication Data
US 2016/0103661 A1    Apr. 14, 2016

Related U.S. Application Data

(63) Continuation of application No. 13/850,405, filed on Mar. 26, 2013, now Pat. No. 9,244,656.

(51) Int. Cl.
*G06F 9/44* (2006.01)
*G06F 9/445* (2006.01)
*H04L 29/08* (2006.01)

(52) U.S. Cl.
CPC . *G06F 8/35* (2013.01); *G06F 8/20* (2013.01); *G06F 8/60* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,056,051 | B2* | 11/2011 | Gerken | G06F 8/51 717/106 |
| 2003/0058277 | A1* | 3/2003 | Bowman-Amuah | G06F 17/30607 715/765 |
| 2003/0208458 | A1* | 11/2003 | Dettinger | G06F 17/30427 |
| 2005/0228803 | A1* | 10/2005 | Farmer | G06Q 10/10 |
| 2006/0293934 | A1* | 12/2006 | Tsyganskiy | G06Q 30/0201 705/7.29 |
| 2007/0156475 | A1 | 7/2007 | Berger et al. | |
| 2007/0156489 | A1 | 7/2007 | Berger et al. | |
| 2007/0156493 | A1 | 7/2007 | Tebbe et al. | |
| 2007/0156499 | A1 | 7/2007 | Berger et al. | |
| 2007/0233539 | A1 | 10/2007 | Suenderhauf et al. | |
| 2007/0233575 | A1 | 10/2007 | Berger et al. | |

(Continued)

*Primary Examiner* — Peling Shaw
(74) *Attorney, Agent, or Firm* — Fish & Richardson P.C.

(57) ABSTRACT

The present disclosure describes methods, systems, and computer program products providing an integrated development environment for client/server environments. One computer-implemented method includes reading a derived business application data model (BADM) associated with a business application into an integrated development environment (IDE), defining a client application data model (CADM) for a client application, defining at least one data mapping rule (DMR) to map at least data translations between the BADM and the CADM, developing the client application based upon at least the CADM, developing at least one web service based upon the BADM, CADM, and the at least one DMR, generating the client application and the at least one web service, and deploying the client application, the at least one web service, and the at least one DMR.

20 Claims, 4 Drawing Sheets

(56) References Cited

U.S. PATENT DOCUMENTS

| | | | |
|---|---|---|---|
| 2008/0046557 A1* | 2/2008 | Cheng | H04M 1/72525 709/224 |
| 2008/0120129 A1 | 5/2008 | Seubert et al. | |
| 2008/0201338 A1* | 8/2008 | Castro | G06F 17/3056 |
| 2009/0171698 A1 | 7/2009 | Suenderhauf et al. | |
| 2010/0049731 A1* | 2/2010 | Kiran Vedula | G06F 17/30997 707/736 |
| 2010/0070555 A1 | 3/2010 | Duparc et al. | |
| 2010/0153158 A1 | 6/2010 | Wex et al. | |
| 2010/0161675 A1* | 6/2010 | Ritter | G06F 17/30294 707/802 |
| 2010/0313182 A1* | 12/2010 | Chen | G06F 8/38 717/109 |
| 2013/0246995 A1* | 9/2013 | Ferrao | G06F 21/54 717/104 |
| 2013/0325867 A1* | 12/2013 | Kemmler | G06F 17/30289 707/740 |
| 2014/0214934 A1 | 7/2014 | Tebbe et al. | |

* cited by examiner

INTEGRATED DEVELOPMENT ENVIRONMENT FOR HETEROGENEOUS CLIENT/SERVER ENVIRONMENTS

CLAIM OF PRIORITY

This application claims priority under 35 USC §120 to U.S. patent application Ser. No. 13/850,405, filed on Mar. 26, 2013, the entire contents of which are hereby incorporated by reference.

BACKGROUND

Business application environments are changing rapidly due to developments in software, hardware, and networking technology as well as adoption of various engineering and development standards. For example, the adopted hypertext markup language (HTML) standard, HTML 5.x, and the ubiquitous use of smartphone and other mobile devices has resulted engineering efforts to retool business applications to support mobile device client user interfaces and form factors. Advancing server technology has also resulted in updates to server platforms that provide both analytical and business applications to clients of various types and in increasing numbers. As business application environments are typically distributed and heterogeneous, developers must necessarily be skilled in multiple hardware, software, and/or networking platforms and/or technologies in order to design, develop, and/or support the business application environments. For example, a typical business application environment is made up of a business application, a business application facade, and client applications, each with particular technologies and associated skill sets, knowledge of which are necessary to develop and maintain the business application environment. The heterogeneous nature of the business application environment results in an increased total cost of development and total cost of ownership for an organization.

SUMMARY

The present disclosure relates to computer-implemented methods, computer-readable media, and computer systems providing an integrated development environment for client/server environments. One computer-implemented method includes reading a derived business application data model (BADM) associated with a business application into an integrated development environment (IDE), defining a client application data model (CADM) for a client application, defining at least one data mapping rule (DMR) to map at least data translations between the BADM and the CADM, developing the client application based upon at least the CADM, developing at least one web service based upon the BADM, CADM, and the at least one DMR, generating the client application and the at least one web service, and deploying the client application, the at least one web service, and the at least one DMR.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the IDE is integrated into at least a client application layer, a business application facade layer, and a business application layer.

A second aspect, combinable with any of the previous aspects, wherein the BADM is derived from a business application by interpreting a business application data model through analysis of at least one of a database schema or a WSDL file.

A third aspect, combinable with any of the previous aspects, further comprising developing, based on at least the CADM, at least one other client application for a technology platform different than the client application.

A fourth aspect, combinable with any of the previous aspects, further comprising at least one of deploying the generated client application to an application service provider or directly to a client runtime container.

A fifth aspect, combinable with any of the previous aspects, wherein the deployed at least one web service and the at least one DMR are available for use by a business application facade providing an interface between the client application and the business application.

The subject matter described in this specification can be implemented in particular implementations so as to realize one or more of the following advantages. First, a developer without client and/or business application technology knowledge can model an end-to-end solution for an existing business application. Second, a business application data model (BADM) can be derived from an existing business application and serve as a central artifact to generate a web service deployed to a business application facade and a client application. The BADM can also be defined independently of a business application for the same purpose. Third, an integrated development environment (IDE) provides a set of developer tools to enhance and simplify development/integration of business applications and/or client applications. Fourth, the IDE provides utilities to at least generate client applications, web services, and/or model mapping rules. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, computer-program products, and systems providing an integrated development environment for client/server environments. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Figure 1:
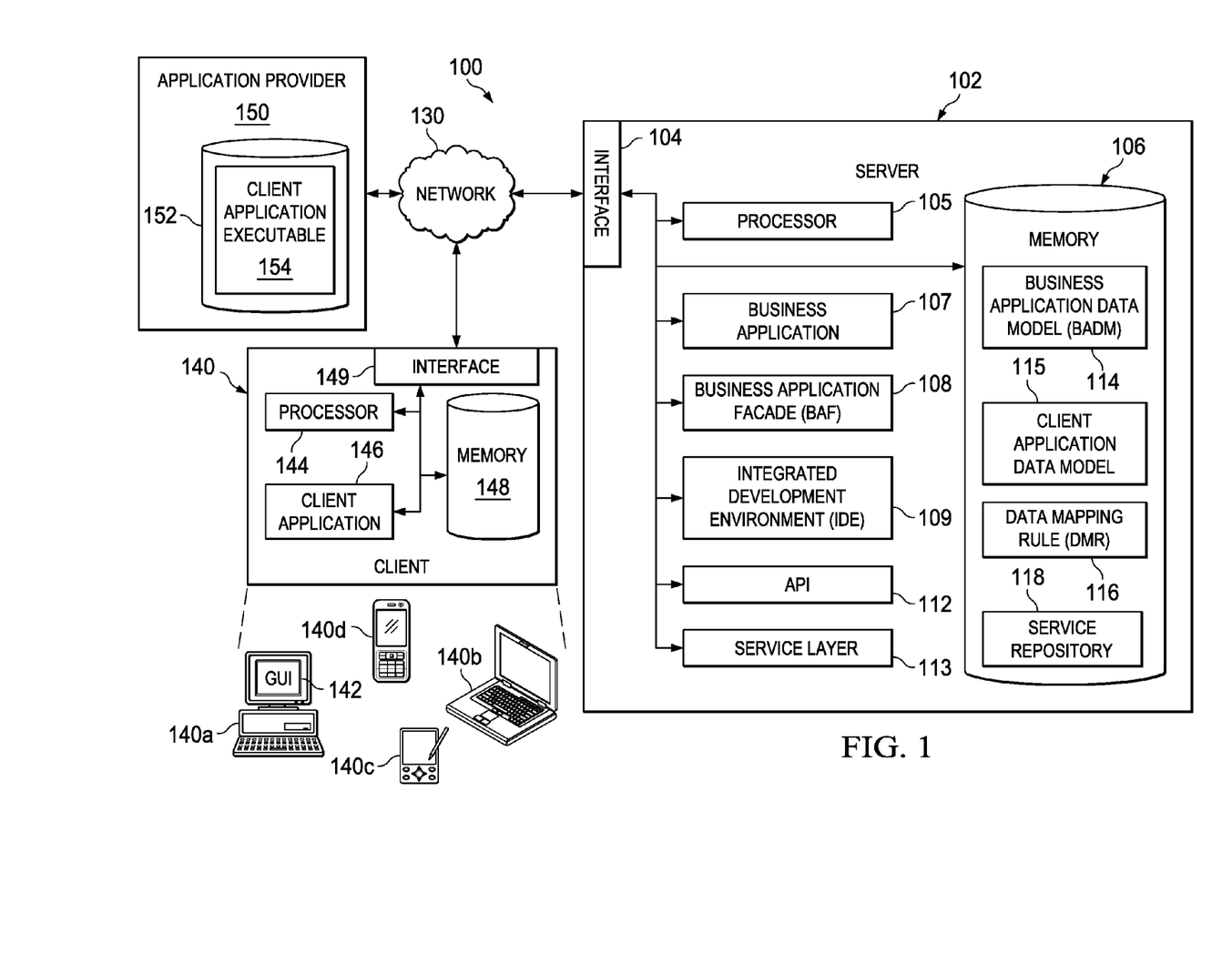
FIG. 1 is a block diagram illustrating an example distributed computing system providing an integrated development environment for client/server environments according to an implementation.

FIG. 1 is a block diagram illustrating an example distributed computing system 100 providing an integrated development environment (IDE) for client/server environments according to an implementation. The illustrated example distributed computing system 100 includes or is communicably coupled with a server 102, a client 140, and an application server 150 that communicate across a network 130. At a high level, the server 102 is an electronic computing device operable to receive, transmit, process, store, or manage data and information associated with the example distributed computing system 100. According to some implementations, server 102 may also include or be communicably coupled with an e-mail server, a web server, a caching server, a streaming data server, and/or other suitable server. The following described computer-implemented methods, computer-readable media, computer systems, and components of the example distributed computer system 100 provide functionality through one or more graphical user interfaces (GUIs) providing an efficient and user-friendly presentation of data provided by or communicated within the example distributed computing system 100.

The application provider 150 typically provides one or more client application executables 154 from a memory 152 to a client 140. For example, the application provider 150 can be considered an "app" store or similar type location for obtaining software applications. In some implementations, the application provider is owned/operated by a third-party to the owner/operator of the server 102. In other implementations, the application provider 150 can be owned and/or operated by the server 102 owner/operator. While application provider 150 and its associated components are illustrated as external to the server 102, in alternative implementations, the application provider 150 can be internal to the server 102 and/or other component of the example distributed computing system 100. The client application executable 154 may be consistent with the client application 146 in that client application 146 is an installed version of the client application executable 154 retrieved from the application provider 150 and installed on the client 140. In some implementations, the application provider 150 can provide requested client application executables 154 in real-time and/or substantially in real-time data. In some implementations, the application provider 150 can provide references/links to additional external application providers 150 and/or client application executables 154 (not illustrated), such as in a cloud-computing environment.

In general, the server 102 is a server that stores and/or executes one or more business applications 107, business application facades 108, and/or integrated development environments 109 interacted with using requests and responses sent by clients 140 within and communicably coupled to the illustrated example distributed computing system 100. In some implementations, the server 102 may comprise a web server, where the business applications 107, business application facades 108, and/or integrated development environments 110 represent one or more web-based applications accessed and executed by the client 140 using the network 130 or directly at the server 102 to perform the programmed tasks or operations of a particular business application 107, business application facade 108, and/or integrated development environment 110.

The server 102 is responsible for receiving requests using the network 130, for example login requests, software selection, configuration, and/or purchase requests from one or more client applications 146 (described below) associated with the client 140 of the example distributed computing system 100 and responding to the received requests by processing said requests in one or more of a business application 107, business application facade 108, and/or integrated development environment 110. In addition to requests from the client 140, requests may also be sent to the server 102 from internal users, external or third-parties, other automated applications, as well as any other appropriate entities, individuals, systems, or computers.

In some implementations, the business application 107, business application facade 108, and/or integrated development environment 110 can provide GUI interfaces or interface with one or more other components of the example distributed computing system 100 in providing an integrated development environment for client/server environments. For example, a request to generate a client application can be performed using a GUI tool interface accessible to a user on a particular client 140.

In some implementations, requests/responses can be sent directly to server 102 and/or application provider 150 from a user accessing server 102 directly. In some implementations, the server 102 may comprise a web server, where one or more of the components of server 102 represent web-based applications accessed and executed by the client 140 using the network 130 or directly at the server 102 to perform the programmed tasks or operations of the various components of server 102.

In some implementations, any and/or all components of the server 102, both hardware and/or software, may interface with each other and/or the interface using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the example distributed computing system 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the example distributed computing system 100, alternative implementations may illustrate the API 112 and/or the service layer 113 as stand-alone components in relation to other components of the example distributed computing system 100. Moreover, any or all parts of the API 112 and/or the service layer 113 may be implemented as child or sub-modules of another software module, enterprise application, or hardware module without departing from the scope of this disclosure.

The server 102 includes an interface 104. Although illustrated as a single interface 104 in FIG. 1A, two or more interfaces 104 may be used according to particular needs, desires, or particular implementations of the example distributed computing system 100. The interface 104 is used by the server 102 for communicating with other systems in a distributed environment—including within the example distributed computing system 100—connected to the network 130; for example, the client 140 as well as other systems communicably coupled to the network 130. Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The server 102 includes a processor 105. Although illustrated as a single processor 105 in FIG. 1A, two or more processors may be used according to particular needs, desires, or particular implementations of the example distributed computing system 100. Generally, the processor 105 executes instructions and manipulates data to perform the operations of the server 102. Specifically, the processor 105 executes the functionality required to provide an integrated development environment for client/server environments.

The server 102 also includes a memory 106 that holds data for the server 102, client 140, and/or other components of the example distributed computing system 100. Although illustrated as a single memory 106 in FIG. 1, two or more memories may be used according to particular needs, desires, or particular implementations of the example distributed computing system 100. While memory 106 is illustrated as an integral component of the server 102, in alternative implementations, memory 106 can be external to the server 102 and/or the example distributed computing system 100. In some implementations, the memory 106 includes one or more instances of business application data model 114, a data mapping rule 116, and/or a service repository 118.

The business application data model (BADM) 114 is made up of semantically linked entity types, entity attributes, and entity relationships persisted in a memory, for example memory 106. In some implementations, memory 106 can be a database. In some implementations, the BADM 114 can be split into smaller sub-models as well as refined through the additions, modifications, and/or deletions of entity types and other sub-models. A particular model, for example the BADM 114, is termed an application data model (ADM) if it forms an independent unit from a commercial viewpoint (e.g., describing a commercial business application). The BADM 114 can act as a common artifact used between layers of a business application environment (described below in relation to FIG. 2).

The BADM 114 can be generated, stored, and/or converted from/into any suitable format or form, for example, binary, text, numerical, a database file, a flat file, or the like. In some implementations, the BADM 114 can directly accessed by any suitable component of the example distributed computing system 100, for example the business application 107, business application facade 108, and/or integrated development environment 110. While the BADM 114 is illustrated as an integral component of the memory 106, in alternative implementations, the BADM 114 can be external to the memory 106 and/or be separated into both an external BADM 114 and an internal BADM 114 as long as accessible using network 130. In some implementations, the BADM 114 can interface with and/or act as a reference to an internal and/or external storage location and/or provide functionality to retrieve BADM 114 data stored in an external storage location. The BADM 114 can be derived by a business application model adapter framework (described below) from various sources, including extracted relational database schemas information (e.g., associated entities, properties, relationships, etc.), SOAP service signatures extracted out of WSDL files, the parameter structure of an RFC, or other suitable data.

The client application target data model (CADM) 115 is made up of semantically linked entity types, entity attributes, and entity relationships persisted in a memory, for example memory 106 and/or memory 148 in some instances. In some implementations, the CADM 115 can be split into smaller sub-models as well as refined through the additions, modifications, and/or deletions of entity types and other sub-models. The CADM 115 can also act as a common artifact used between layers of a business application environment (described below in relation to FIG. 2). The CADM 115 can be derived by a data modeler (described below) from various sources, including extracted relational database schemas information (e.g., associated entities, properties, relationships, etc.), SOAP service signatures extracted out of WSDL files, the parameter structure of an RFC, or other suitable data.

The CADM 115 can be generated, stored, and/or converted from/into any suitable format or form, for example, binary, text, numerical, a database file, a flat file, or the like. In some implementations, the CADM 115 can directly accessed by any suitable component of the example distributed computing system 100, for example the business application 107, business application facade 108, and/or integrated development environment 110. While the CADM 115 is illustrated as an integral component of the memory 106, in alternative implementations, the CADM 115 can be external to the memory 106 (e.g., stored in memory 148) and/or be separated into both an external CADM 115 and an internal CADM 115 as long as accessible using network 130. In some implementations, the CADM 115 can interface with and/or act as a reference to an internal and/or external storage location and/or provide functionality to retrieve CADM 115 data stored in an external storage location.

The data mapping rule (DMR) 116 may represent policies, conditions, parameters, variables, algorithms, instructions, constraints, references, and any other appropriate information used by the business application 107, business application facade 108, and/or integrated development environment 109 to allow mapping of data from a particular first format/standard into a second format/standard, for example between a particular BADM and CADM. As a runtime example, a call from a client application 146 to a business application 107 could be received in an open data protocol (OData)-compliant format. One or more DMRs 116 can be used by one or more web services to map data in the receive call to data passed to the business application 107 in a remote function call (RFC) generated by the one or more web services. In some implementations, the DMR 116 is generated/modified by one or more applications/utilities provided by the integrated development environment 109.

Although shown as integral to the server 102, in some implementations, the DMR 116 is stored remotely from the server 102 as long as the DMR 116 is accessible by the server 102. The DMR 116 may be accessed, for example, using a web service, a remote access system or software, a local or remote client 140, or other suitable system component. In some implementations, access to the DMR 116 can be restricted by security policies and/or procedures.

In some implementations, the DMR 116 can be modified/replaced to reflect changes in technology, standards, corporate policies; support of particular hardware and/or software; for security reasons; and/or the like. A change to the DMR 116 may, for example, trigger a rebuilding of a client application executable, web service, and/or other suitable component of the example distributed computing system 100.

The DMR 116 can be represented by any type of suitable data structure in any suitable format. For example, the DMR 116 could be an executable module, spreadsheet, database, flat file, binary file, multi-part file, linked list, and/or the like. The DMR 116 can be generated, stored, and/or converted from/into any suitable format or form. In some implementations, multiple DMRs 116 can be used to map a single client application 146 to a single business application 107, multiple client applications 146 to a single business application 146, and/or multiple client applications 146 to multiple business applications 107.

In some implementations, the DMR 116 can directly accessed by any suitable component of the example distributed computing system 100, for example the business application 107, business application facade 108, and/or integrated development environment 110. While the DMR 116 is illustrated as an integral component of the memory 106, in alternative implementations, the DMR 116 can be external to the memory 106 and/or be separated into both an external DMR 116 and an internal DMR 116 as long as it is accessible using network 130. In some implementations, the DMR 116 can act as a reference to another DMR 116, internal and/or external storage location, and/or provide functionality to interface with and/or retrieve one or more other DMRs 116. In some implementations, a separate data structure (not illustrated) can be used as a reference to the data stored within a particular DMR 116.

The service repository 118 can be any appropriate data structure/memory holding web services. Web services are web-based interfaces based on open and/or commonly accepted standards used by different applications to communicate. Standards could include, for example, OData, XML, SOAP, Web Service Definition Language (WSDL), Universal Description, Discovery, and integration (UDDI), hypertext transfer protocol (HTTP) and/or hypertext transfer protocol secure (HTTPS) requests, or an RFC interface, and the like. Web services are typically self-contained, modularized, executable entities that can be published, searched for, and accessed across a network. For a caller or a sender, a web service acts as a "black box" where input provided using an API results in some type of result. For example, a client application 146 wishing to "talk" to a business application 107 could use a web-services-compliant call (consistent with a known API). The called web service performs various functions, including using one or more DMRs 116 to translate data passed in the call into a message of a format acceptable to a target business application, for example a business application 107. The web service can then transmit the message to the target business application 107 for further processing and vice versa to transmit a response from the business application 107 to the client application 146. Although shown as integral to memory 106 of server 102, in some implementations, the service repository 118 can be wholly or partially integrated into the business application facade 108. In some implementations, the service repository can be wholly or partially external to server 102 as long as accessible using network 130.

In some implementations, the web services typically follow REST architecture constraints, including business data addressed by a universal resource identifier (URI), server and client mange only their own state (specifically the server does not make any assumption on a client state and vice versa), and the server provides the information whether a specific resource is supposed to be cached at the client of the web infrastructure.

The business application 107 is any type of application that allows the client 140 to request, view, add, edit, delete, and/or consume content on the client 140 obtained from the server 102, another client 140, an application provider 150, and/or an additional content provider (not illustrated) in response to a received request from the client 140. A content provider may be, for example, applications and data on a server and/or external services, business applications, business application servers, databases, RSS feeds, document servers, web servers, streaming servers, caching servers, or other suitable content sources.

In some implementations, the business application 107 can also use business application data (not illustrated) including business objects and data, business processes, content provider locations, addresses, storage specifications, content lists, access requirements, or other suitable data. For example, for a database content provider, the business application data may include the server Internet Protocol (IP) address, URL, access permission requirements, data download speed specifications, etc. associated with the database content provider.

Once a particular business application 107 is launched, a client 140 may interactively process a task, event, or other information associated with the server 102. The business application 107 can be any application, program, module, process, or other software that may execute, change, delete, generate, or otherwise manage information associated with a particular client 140. For example, the business application 107 may be a portal application, a business application, and/or other suitable application consistent with this disclosure. The business application 107 can also interface with the business application facade 108, integrated development environment 109, and/or other suitable component of the example distributed computing system 100 to wholly or partially complete a particular task. For example, the described components could perform client application development/deployment in a sequential, parallel, and/or other suitable manner.

Additionally, a particular business application 107 may operate in response to and in connection with at least one request received from other business applications 107, including business applications 107 or other components (e.g., software and/or hardware modules) associated with another server 102. In some implementations, the business application 107 can be and/or include a web browser. In some implementations, each business application 107 can represent a network-based application accessed and executed using the network 130 (e.g., through the Internet, or using at least one cloud-based service associated with the business application 107). For example, a portion of a particular business application 107 may be a web service associated with the business application 107 that is remotely called, while another portion of the business application 107 may be an interface object or agent bundled for processing at a remote client 140. Moreover, any or all of a particular business application 107 may be a child or sub-module of another software module or enterprise application (not illustrated) without departing from the scope of this disclosure. Still further, portions of the particular business application 107 may be executed or accessed by a user working directly at the server 102, as well as remotely at a corresponding client 140. In some implementations, the server 102 or any suitable component of server 102 or the example distributed computing system 100 can execute the business application 107.

The business application facade (BAF) 108 provides a defined API and acts as an interface/gateway between a client 140 client application and components of server 102. The BAF 108 can be any application, program, module, process, or other hardware/software capable of interfacing between client/server requests/responses using various standards/protocols, for example, OData, XML, SOAP, WSDL, UDDI, HTTP/HTTPS, RFC, and/or other suitable standards/protocols. Although illustrated as integral to server 102, in some implementations, the BAF 108 can be stand-alone, for example as part of a separate server communicating using network 130. In some implementations, the BAF 108 can be incorporated into any component of the example distributed computing system 100, including the business application 107. In some implementations the BAF 108 may be part of a hardware server, a software server, and/or a virtual server. In some implementations, the BAF 108 can be part of a web server, a streaming server, an RSS server, or other suitable server.

In some implementations, the BAF 108 provides a communication interface between a client application 146 and a business application 107 with one or more web services using one or more DMRs 116 for data/format transformation specifics between client application 146 requests and the business application 107. For example, a client 140 client application 146 makes an OData-compliant call using a web browser directed to a business application 107. The BAF 108 uses one or more web services to convert the received OData-compliant call into a back-end request of the same or another format, for example RFC, using one or more DMRs 116 and transmits the converted request to the business application 107 for processing. A response from the business application 107 back to the client application 146 is typically a reverse of this process. In some implementations, the BAF 108 can also provide an interface between various other components of the server 102. In some implementations, the BAF 108 can provide logging and notification functions, for example to report successfully completion of tasks, errors, and the like. The BAF 108 can also receive instructions from the integrated development environment 109 to read/write web integrated-development-environment-generated web services to the service repository 118 and/or to read/write one or more integrated-development-environment-generated DMRs 116 to storage, such as memory 106.

A particular BAF 108 may operate in response to and in connection with at least one request received from other BAF 108, including a BAF 108 associated with another server 102. In some implementations, the BAF 108 can include a web browser. In some implementations, each BAF 108 can represent a network-based application accessed and executed using the network 130 (e.g., through the Internet, or using at least one cloud-based service associated with the BAF 108). For example, a portion of a particular BAF 108 may be a web service associated with the BAF 108 that is remotely called, while another portion of the BAF 108 may be an interface object or agent bundled for processing at a remote client 140. Moreover, any or all of a particular BAF 108 may be a child or sub-module of another software module or enterprise application (not illustrated) without departing from the scope of this disclosure. Still further, all or portions of the particular BAF 108 may be executed or accessed by requests received from a user/component working directly on the server 102, as well as remotely at a client 140.

Figure 2:
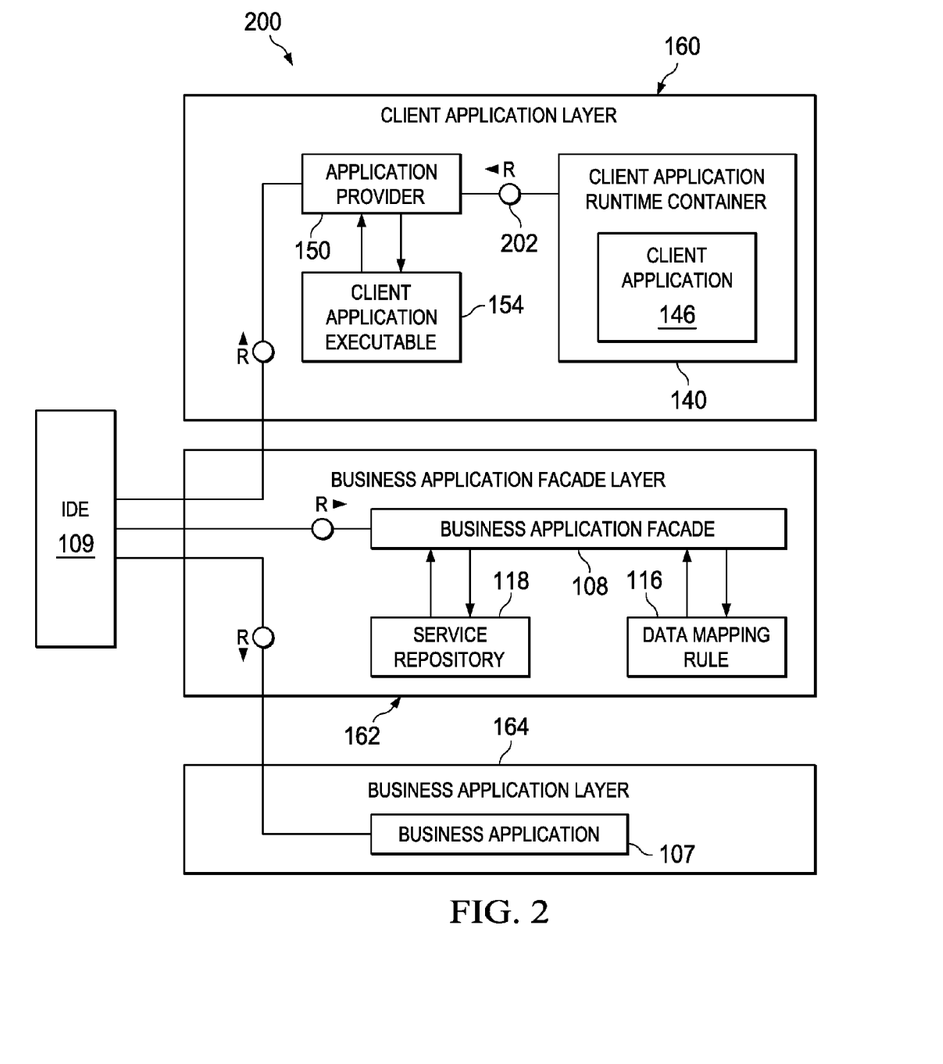
FIG. 2 is a block diagram illustrating components in relation to business application environment layers of the example distributed computing system according to an implementation.
Figure 3:
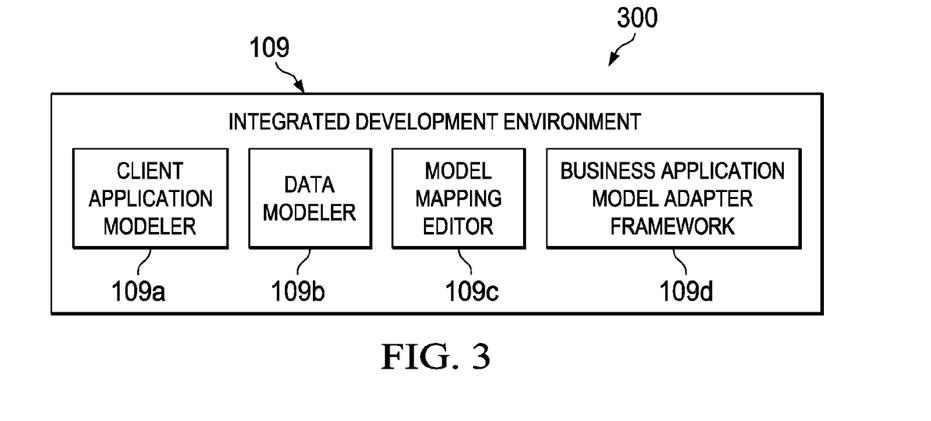
FIG. 3 is a block diagram illustrating sub-components of the illustrated development environment component of the example distributed computing system according to an implementation.

The integrated development environment (IDE) 109 can be any application, program, module, process, or other hardware/software capable of interfacing with components of the business application environment at multiple layers and providing development tools and/or utilities, for example as illustrated in FIGS. 2 and 3. The IDE 109 provides developer tools/utilities including: 1) a technology agnostic data modeler to generate data models; for example CADMs 2) a web service generator utility to provide validation logic that checks whether a specific property is provided or not provided by the client application; a web service generator to generate web services derived from a CADM associated with a client application; 3) a deployment support utility for deploying both client application executable and/or web services tailored for a set of client applications; 4) a client application modeler allowing modeling client applications based on a data model; and 5) a client application generator that is able to upload the client application to an application provider (e.g., a repository where client runtime containers can download applications); 6) a model mapping editor tool enabling a user to map a structure of an existing business application to the data model provided by the data modeler; and 7) a model mapping generator generating artifacts required to map from a business application to a web service. In some implementations, other suitable tools consistent with this disclosure are also envisioned.

Although illustrated as integral to server 102, in some implementations, the IDE 109 can be part of a stand-alone/decoupled system, for example as part of a separate server communicating with components of the example distributed computing system 100 using network 130. In some implementations, the IDE 109 can be incorporated into any component of the example distributed computing system 100. In some implementations the IDE 109 may be part of a hardware server, a software server, and/or a virtual server. Various portions of the IDE 109 can also executed in a distributed manner across the example distributed computing system 100.

A particular IDE 109 may operate in response to and in connection with at least one request received from other IDE 109s, including an IDE 109 associated with another server 102. In some implementations, the IDE 109 can include a web browser. In some implementations, each IDE 109 can represent a network-based application accessed and executed using the network 130 (e.g., through the Internet, or using at least one cloud-based service associated with the IDE 109). For example, a portion of a particular IDE 109 may be a web service associated with the IDE 109 that is remotely called, while another portion of the IDE 109 may be an interface object or agent bundled for processing at a remote client 140. Moreover, any or all of a particular IDE 109 may be a child or sub-module of another software module or enterprise application (not illustrated) without departing from the scope of this disclosure. Still further, all or portions of the particular IDE 109 may be executed or accessed by requests received from a user/component working directly on the server 102, as well as remotely at a client 140.

The client 140 may be any computing device operable to connect to or communicate with at least the server 102 and/or the application provider 150 using the network 130. In general, the client 140 comprises an electronic computing device operable to receive, transmit, process, and store any appropriate data associated with the example distributed computing system 100. Typically the client 140 will process code generated by the IDE, for example client application executables, GUIs, utilities/tools, and the like. The client 140 is normally aware of a defined/derived CADM but not a BADM. In some implementations, the client 140 could be aware of and use a BADM. The client typically includes a processor 144, a client application 146, a memory 148, and/or an interface 149.

The client application 146 is any type of application that allows the client 140 to navigate to/from, request, view, edit, delete, and or manipulate content on the client 140, for example an HTML 5 or ANDROID application. In some implementations, the client application 146 can be and/or include a web browser. In some implementations, the client-application 146 can use parameters, metadata, and other information received at launch to access a particular set of data from the server 102 and/or the application provider 150. Once a particular client application 146 is launched, a user may interactively process a task, event, or other information associated with the server 102 and/or the external data 150. Further, although illustrated as a single client application 146, the client application 146 may be implemented as multiple client applications in the client 140. In some implementations, the client application 146 may act as a GUI interface for the business application 107, IDE 109, and/or other components of server 102 and/or other components of the example distributed computing system 100, for example the application provider 150.

The interface 149 is used by the client 140 for communicating with other computing systems in a distributed computing system environment, including within the example distributed computing system 100, using network 130. For example, the client 140 uses the interface to communicate with the server 102 and/or the application provider 150 as well as other systems (not illustrated) that can be communicably coupled to the network 130. The interface 149 may be consistent with the above-described interface 104 of the server 102 or other interfaces within the example distributed computing system 100. The processor 144 may be consistent with the above-described processor 105 of the server 102 or other processors within the example distributed computing system 100. Specifically, the processor 144 executes instructions and manipulates data to perform the operations of the client 140, including the functionality required to send requests to the server 102 and/or application provider 150 and to receive and process responses from the server 102 and/or the application provider 150. The memory 148 typically stores objects and/or data associated with the purposes of the client 140 but may also be consistent with the above-described memory 106 of the server 102 or other memories within the example distributed computing system 100, for example application provider 150, and be used to store data similar to that stored in the other memories of the example distributed computing system 100 for purposes such as backup, caching, and the like.

Further, the illustrated client 140 includes a GUI 142. The GUI 142 interfaces with at least a portion of the example distributed computing system 100 for any suitable purpose, including generating a visual representation of a web browser. The GUI 142 may be used to view and navigate various web pages located both internally and externally to the server 102, view data associated with the server 102 and/or application provider 150, or any other suitable purpose. In particular, the GUI 142 may be used in conjunction with content from server 102 and/or application provider 150 to provide an IDE 109 for client/server environments.

There may be any number of clients 140 associated with, or external to, the example distributed computing system 100. For example, while the illustrated example distributed computing system 100 includes one client 140 communicably coupled to the server 102 and external data 150 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142, as shown with respect to the client 140.

FIG. 2 is a block diagram illustrating components of the example distributed computing system 100 in relation to component business application environment layers 200 according to an implementation. As illustrated, the business application environment is made up of three layers: 1) A client application layer 160; 2) a business application facade layer 162; and 3) a business application layer 164. As shown, the IDE 109 is integrated into each layer.

The client application layer 160 contains a client app runtime container (e.g., client) 140 with client application 146. Requests ("R") are made (in the indicated direction 202—with responses taking the opposite direction) from the client 140 to an application provider 150 for one or more client application executables 154 which can be installed on the client app runtime container 140 as additional client applications 146. As shown, the application provider can read/write the one or more client application executables 154, typically to a memory 154 (as illustrated in FIG. 1) such as a database and/or other suitable storage location. In some implementations, the IDE 109 can generate and provide one or more application executables 154 to the application provider 150 to be made available to the client app runtime container 140.

The business application facade layer 162 contains the BAF 108 as well as the service repository 118 and/or the data mapping rule 116. In some implementations, the IDE 109 can generate and provide web services for the service repository 118 and/or one or more DMRs 116 for use by the BAF 108. As shown, the BAF 108 can read/write web services and/or one or more DMRs 116 to the service repository 118/DMR 116, respectively.

The business application layer contains the business application 107. In some implementations, the IDE 109 can derive a data model of the business application 107 (a BADM 114) from a business application 107 using a business application model adapter framework (illustrated in FIG. 3 and described below) containing functionality to derive business application 107 model data and place it into a format consumable by the IDE 109 and associated applications/utilities (e.g., a BADM). The business application 107 may provide model data in various formats to be extracted. Examples include relational database schemas (and associated entities, properties, relationships, etc.), SOAP service signatures extracted out of WSDL files, or simply the parameter structure of a RFC. These example formats have at least a data description of entities with properties and associated primitive data types. In some instances, some information can be unavailable (e.g., associations between entities). The missing information needs to be added manually using a data modeler (described below). To allow the IDE to handle the derived data models in a uniform format, the business application model adapter framework can translate the specific representation of a particular data model into a unified format to be used within the integrated development environment 109.

FIG. 3 is a block diagram 300 illustrating sub-components of the integrated development environment (IDE) 109 component of the example distributed computing system 100 according to an implementation. As illustrated, in some implementations, the IDE 109 can contain a client application modeler 109a, data modeler 109b, model mapping editor 109c, and/or business application model adapter framework 109d.

The client application modeler 109a is a GUI tool enabling a developer to model elements of a client application, for example data entry fields, and to bind the elements to a CADM 115.

The data modeler 109b is technology agnostic graphical tool used to create a CADM 115 for a client application used by the IDE 109 to generate BAF 108 web services and one or more client application executables 152. The generated data models have typical entity-relationship model qualities (e.g., entities with typed properties) and are additionally annotated with metadata used by the client application generator utility and the model mapping editor development tool. The annotation is typically read/write or read-only. The annotation informs: 1) the client application modeler to render GUI fields as read/write fields or read-only fields and 2) the web service generator utility to provide validation logic that checks whether a specific property is provided or not provided in the client application. In some implementations, the data model can reuse data definitions from business applications 107 used as parameters of existing API's of the business applications 107.

The model mapping editor 109c enables a developer to describe a mapping between a CADM 115 and a BADM 114. Properties from a BADM 115 can be mapped to form a CADM 115 or define joins between BADM 114 entities to map to a composed CADM 115 entity.

The business application model adapter framework 109d interprets a data model associated with a business application through analysis of various data sources, for example database schemas, WSDL files, an RFC signature, and/or other suitable data, and generates a BADM 114. The business application model adapter framework 109b allows mapping from a propriety model format like WSDL or a database schema to a unified model format used by the IDE 109. In typical implementations, the unified model format is the format used by the CADM 115.

Figure 4A:
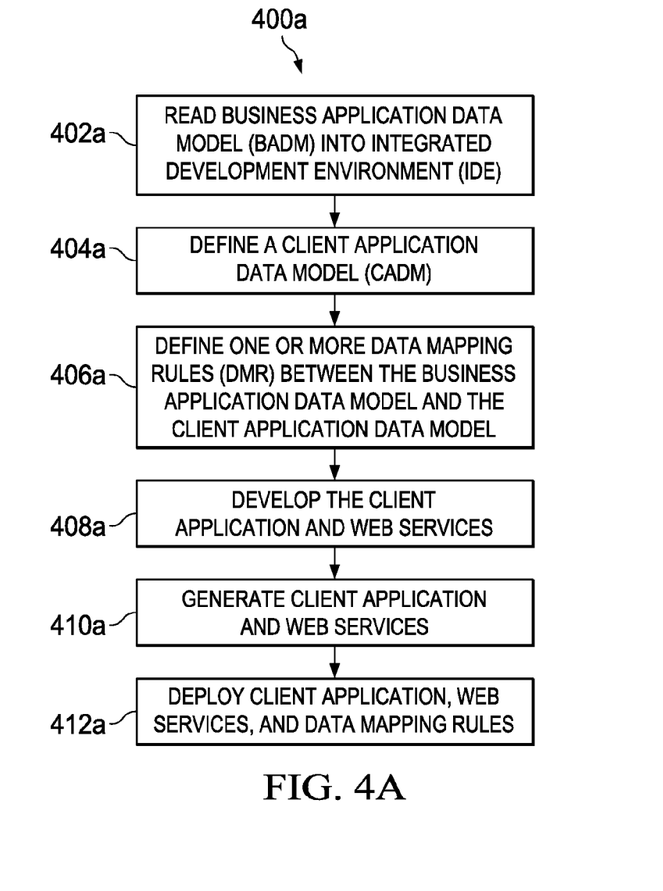
FIG. 4A is a flow chart illustrating a method is a flow chart illustrating a method for developing a client application for a business application using an integrated development environment according to an implementation.

FIG. 4A is a flow chart illustrating a method 400a for developing a client application for a business application using an integrated development environment according to an implementation. For clarity of presentation, the description that follows generally describes method 400a in the context of FIGS. 1, 2, 3, and 4B (described below). However, it will be understood that method 400a may be performed, for example, by any other suitable system, environment, software, and hardware, or a combination of systems, environments, software, and hardware as appropriate. In some implementations, various steps of method 400a can be run in parallel, in combination, in loops, or in any order.

At 402a, a business application data model (BADM) is derived from a business application and read into an integrated development environment (IDE). In some applications the BADM is derived by a business application model adapter framework by interpreting the data model of the business application through analysis of various data sources, for example database schemas, WSDL files, an RFC signature, and/or other suitable data. Potential missing information can be identified by the business application model adapter framework and manually entered by a user. From 402a, method 400a proceeds to 404a.

At 404a, a client application data model (CADM) is created. In some implementations, the amount of data, fields, and entities for the client application GUI needs to be reduced for efficient mapping with the BADM, for example use basic operations such as UPDATE, CREATE, DELETE, etc. The developer can combine entities, services, etc. to simply the CADM and in some instances only include necessary services, entities, etc. The CADM is generated by a data modeler developer tool. From 404a, method 400a proceeds to 406a.

At 406a, one or more data mapping rules (DMRs) are defined between the BADM and the CADM. The one or more DMRs are defined using a model mapping editor developer tool. From 406a, method 400a proceeds to 408a.

At 408a, a client application is developed using a client application modeler developer tool and the created CADM. The client application modeler allows a developer to bind UI elements to the CADM. Note, that given the CADM, client applications conforming to the CADM can be created for multiple platforms (e.g., ANDROID, IOS, WINDOWS, etc.) for the specific use case reflected by the CADM and the one or more associated DMRs/web services. The web services to be deployed on the BAF are also developed. In some implementations a web services modeler developer tool can be used with the CADM and the one or more DMRs to develop the BAF web services. From 408a, method 400a proceeds to 410a.

At 410a, the client application is generated by the IDE as a client application executable. In some implementations, a client application generator utility is used generate the client application executable. In some implementations, there is one client application generator defined for each support client application runtime container. A web service generator generates web service artifacts that are required by the BAF to expose web services to both the business application and/or the client application. In some implementations, there is one web service generator for each supported web service runtime container. From 410a, method 400a proceeds to 412a.

At 412a, the generated client application executable can, in some instances, be transmitted to an application service provider to make available for use using one or more utilities (not illustrated) associated with the IDE. For example, the generated client application executable can be placed into an "app" store or other similar storage location. In other implementations, the generated client application executable can be deployed directly to a client runtime container. The web services and DMRs are also deployed. In some implementations, there is a web service deployment utility (not illustrated) associated with the IDE that coordinates web service deployment. From 412a, method 400a stops.

Figure 4B:
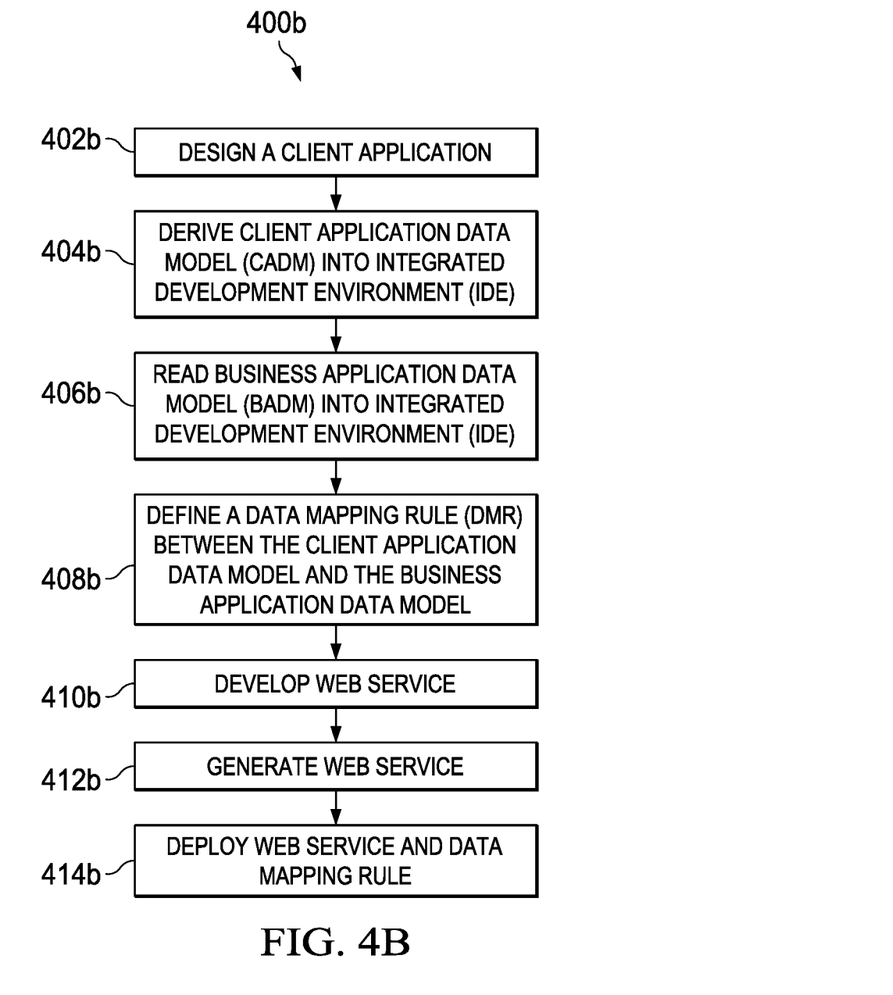
FIG. 4B is a flow chart illustrating a method for mapping an existing client application to a business application according to an implementation.

FIG. 4B is a flow chart illustrating an alternate method 400b for mapping an existing client application to a business application according to an implementation. For clarity of presentation, the description that follows generally describes method 400b in the context of FIGS. 1, 2, 3, and 4A (described above). However, it will be understood that method 400b may be performed, for example, by any other suitable system, environment, software, and hardware, or a combination of systems, environments, software, and hardware as appropriate. In some implementations, various steps of method 400b can be run in parallel, in combination, in loops, or in any order.

At 402b, a client application and associated elements is designed. From 402b, method 400b proceeds to 404b.

At 404b, a client application data model (CADM) is created from the designed application. The CADM is generated by a data modeler developer tool. From 404b, method 400b proceeds to 406b.

At 406b, a derived business application data model (BADM) is read into an integrated development environment (IDE). In some applications the BADM is derived by a business application model adapter framework. From 406b, method 400b proceeds to 408b.

At 408b, one or more data mapping rules (DMRs) are defined between the BADM and the CADM. The one or more DMRs are defined using a model mapping editor developer tool. From 408b, method 400b proceeds to 410b.

At 410b, one or more web services to be deployed on the BAF are developed. In some implementations a web services modeler developer tool can be used with the CADM and to develop the BAF web services. From 410b, method 400b proceeds to 412b.

At 412b, a web service generator generates web service artifacts that are required by the BAF to expose web services to both the business application and/or the client application. In some implementations, there is one web service generator for each supported web service runtime container. From 412b, method 400b proceeds to 414b.

At 412b, the generated web services are deployed to the BAF. In some implementations, there is a web service deployment utility (not illustrated) associated with the IDE that coordinates and web service deployment. The defined DMRs are also deployed for access by at least the client application and/or the business application. From 412b, method 400b stops.

FIGS. 1, 2, 3, and 4A-4B, illustrate and describe various aspects of computer-implemented methods, computer-readable media, and computer systems providing an integrated development environment for client/server environments. While the disclosure discusses the processes in terms of business applications, as will be apparent to one of skill in the art, the described computer-implemented methods, computer-readable media, and computer systems can also be applied to any type of application software consistent with this disclosure. The present disclosure is not intended to be limited to the described and/or illustrated implementations related to business applications, but is to be accorded the widest scope consistent with the principles and features disclosed herein.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDFLOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   deriving, by a computer, a client application data model (CADM) for a client application;
   reading, by a computer, a derived business application data model (BADM) into an integrated development environment (IDE);
   defining, by a computer, at least one data mapping rule (DMR) to map at least data translations between the BADM and the CADM; and
   developing, by a computer, at least one web service based upon the BADM, CADM, and the at least one DMR.

2. The computer-implemented method of claim 1, comprising deriving, by a computer, the CADM using a data modeler developer tool.

3. The computer-implemented method of claim 1, wherein the IDE is integrated into at least a client application layer, a business application facade layer, and a business application layer.

4. The computer-implemented method of claim 1, wherein the BADM is derived from a business application by interpreting a business application data model through analysis of at least one of a database schema or a Web Service Definition Language file.

5. The computer-implemented method of claim 1, further comprising:
   generating, by a computer, the client application; and
   deploying, by a computer, the generated client application to an application service provider or directly to a client runtime container.

6. The computer-implemented method of claim 1, comprising:
   generating, by a computer, the at least one web service; and
   deploying, by a computer, the at least one web service and the at least one DMR.

7. The computer-implemented method of claim 6, wherein the deployed at least one web service and the at least one DMR are available for use by a business application facade providing an interface between the client application and the business application.

8. A non-transitory, computer-readable medium storing one or more computer-readable instructions executable by a computer to:
   derive a client application data model (CADM) for a client application;
   read a derived business application data model (BADM) into an integrated development environment (IDE);
   define at least one data mapping rule (DMR) to map at least data translations between the BADM and the CADM; and
   develop at least one web service based upon the BADM, CADM, and the at least one DMR.

9. The non-transitory, computer-readable medium of claim 8, comprising one or more instructions to derive the CADM using a data modeler developer tool.

10. The non-transitory, computer-readable medium of claim 8, wherein the IDE is integrated into at least a client application layer, a business application facade layer, and a business application layer.

11. The non-transitory, computer-readable medium of claim 8, wherein the BADM is derived from a business application by interpreting a business application data model through analysis of at least one of a database schema or a Web Service Definition Language file.

12. The non-transitory, computer-readable medium of claim 8, further comprising one or more instructions to:
   generate the client application; and
   deploy the generated client application to an application service provider or directly to a client runtime container.

13. The non-transitory, computer-readable medium of claim 8, comprising one or more instructions to:
   generate the at least one web service; and
   deploy the at least one web service and the at least one DMR.

14. The non-transitory, computer-readable medium of claim 13, wherein the deployed at least one web service and the at least one DMR are available for use by a business application facade providing an interface between the client application and the business application.

15. A computer-implemented system, comprising:
a hardware processor interoperably coupled with a computer memory and configured to:
derive a client application data model (CADM) for a client application;
read a derived business application data model (BADM) into an integrated development environment (IDE);
define at least one data mapping rule (DMR) to map at least data translations between the BADM and the CADM; and
develop at least one web service based upon the BADM, CADM, and the at least one DMR.

16. The computer-implemented system of claim 15, comprising one or more instructions to derive the CADM using a data modeler developer tool.

17. The computer-implemented system of claim 15, wherein the IDE is integrated into at least a client application layer, a business application facade layer, and a business application layer.

18. The computer-implemented system of claim 15, wherein the BADM is derived from a business application by interpreting a business application data model through analysis of at least one of a database schema or a Web Service Definition Language file.

19. The computer-implemented system of claim 15, further comprising one or more instructions to:
generate the client application; and
deploy the generated client application to an application service provider or directly to a client runtime container.

20. The computer-implemented system of claim 15, comprising one or more instructions to:
generate the at least one web service; and
deploy the at least one web service and the at least one DMR, wherein the deployed at least one web service and the at least one DMR are available for use by a business application facade providing an interface between the client application and the business application.

* * * * *